US006707837B1

(12) United States Patent
Müller

(10) Patent No.: US 6,707,837 B1
(45) Date of Patent: Mar. 16, 2004

(54) METHOD AND DEVICE FOR OBTAINING A FLOW OF PHOTONS BETWEEN RESONANCES IN AN ELECTROMAGNETIC RESONATOR IN A CONTROLLED MANNER

(76) Inventor: Eberhard Müller, Am Westhang 68, 58640 Iserlohn (DE)

( * ) Notice: Subject to any disclaimer, the term of this patent is extended or adjusted under 35 U.S.C. 154(b) by 0 days.

(21) Appl. No.: 09/787,101

(22) PCT Filed: Aug. 24, 1999

(86) PCT No.: PCT/EP99/06211

§ 371 (c)(1),
(2), (4) Date: Jul. 2, 2001

(87) PCT Pub. No.: WO00/16341

PCT Pub. Date: Mar. 23, 2000

(30) Foreign Application Priority Data

Sep. 14, 1998 (CH) .............................................. 1870/98

(51) Int. Cl.[7] .................................................. H01S 3/08
(52) U.S. Cl. ............................ 372/92; 372/69; 372/109
(58) Field of Search ............................ 372/92, 69, 109

(56) References Cited

U.S. PATENT DOCUMENTS 4,809,292 A * 2/1989 Muller ........................ 372/92
6,314,809 B1 * 11/2001 Kasevich et al. ............. 73/382

* cited by examiner

*Primary Examiner*—Paul Ip
*Assistant Examiner*—Leith A Al-Nazer
(74) *Attorney, Agent, or Firm*—Shoemaker and Mattare

(57) ABSTRACT

Photon flow in an electromagnetic resonator is controlled, in a cavity having reflecting walls, by designing the cavity shape, size, reflectivity and/or medium therein so that the transition probability for the transition of photons between neighboring modes in the range between an initial resonant frequency and a target resonant frequency is larger than the probability for the absorption of photons.

14 Claims, 4 Drawing Sheets

Figure 1
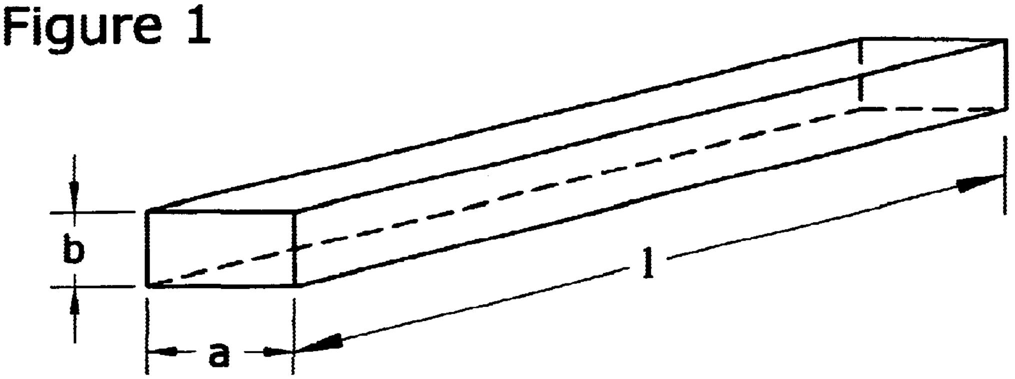
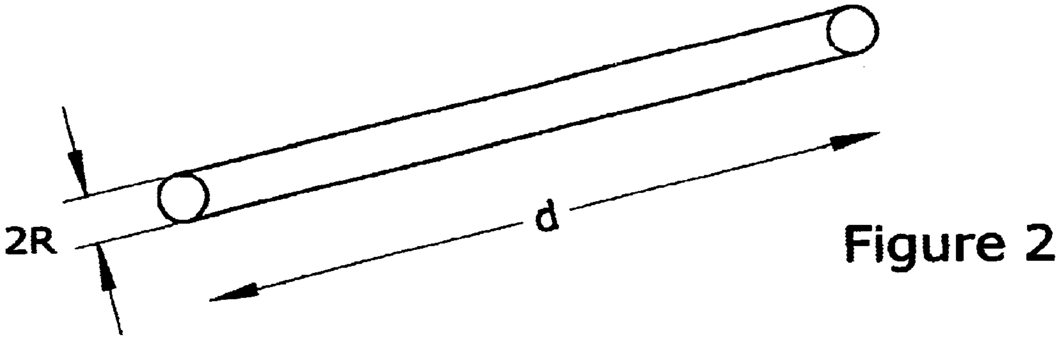
Figure 2
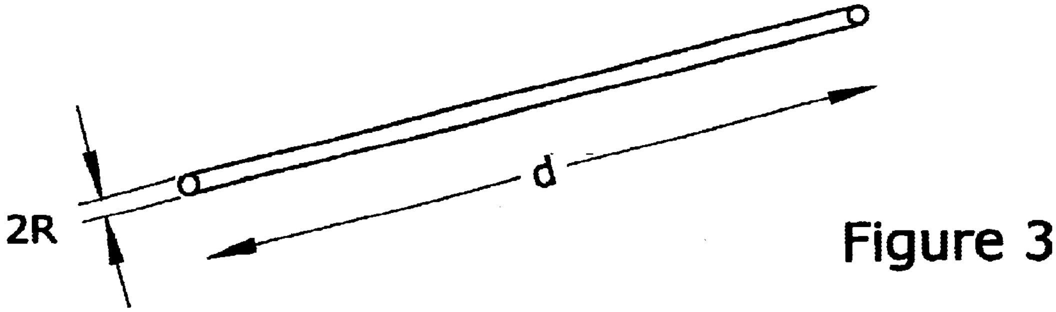
Figure 3

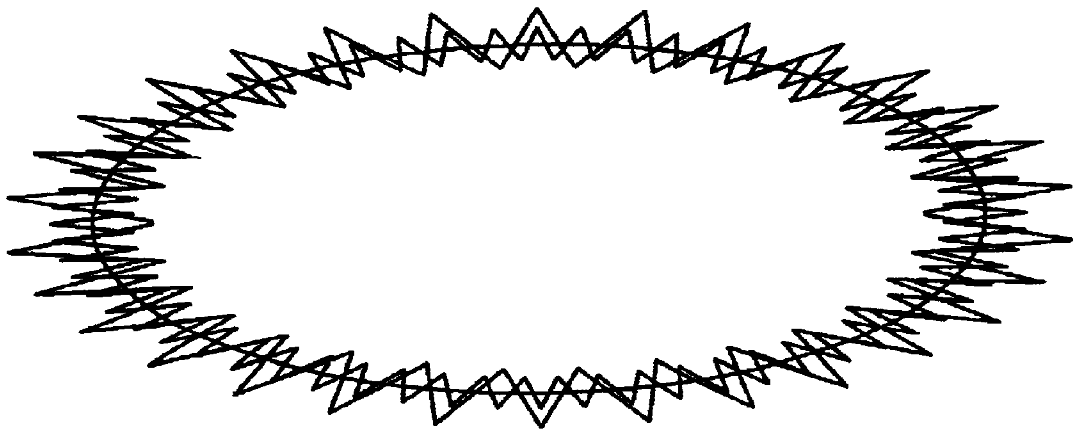
Figure 6
Figure 7
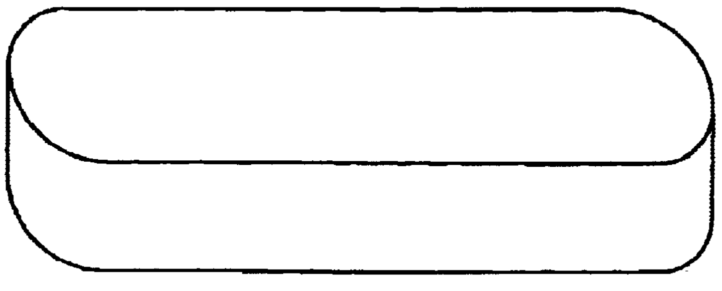

METHOD AND DEVICE FOR OBTAINING A FLOW OF PHOTONS BETWEEN RESONANCES IN AN ELECTROMAGNETIC RESONATOR IN A CONTROLLED MANNER

BACKGROUND OF THE INVENTION

The invention relates to a device and to a method for the controlled achieving of a photon flow between at least one selected resonance of an electromagnetic resonator and a selected target resonance of the resonator, wherein this photon flow in particular supports the redistribution of electromagnetic radiation between the resonances of the resonator in producing a Bose-Einstein photon condensate.

From WO 87/01503 there is known a method and a device for converting electromagnetic waves into monochromatic, coherent electromagnetic radiation with a predeterminable frequency and into heat radiation, wherein the predeterminable frequency lies at the lower edge of the Planck-distributed frequency spectrum of the heat radiation. Thereby, electromagnetic radiation is concentrated in a resonator in a manner such that the average radiation density in the resonator exceeds a critical value and the part of the radiation exceeding this critical value occupies the lowest electromagnetic energy mode of the resonator. The invention WO 87/01503 technically applies the Bose-Einstein condensation in the case of photons.

It is a disadvantage of this known device that the redistribution process for the number of photons exceeding the critical value of the electromagnetic radiation in the resonator is not exactly controllable. If for example the over-critical radiation density with respect to an average radiation temperature is produced by a stationary flow equilibrium, wherein the frequency spectrum of an essential part of the electromagnetic radiation radiated into the resonator lies in the vicinity of a certain resonator resonance, there arises the question of how the photons may flow out of the vicinity of this initial frequency into the fundamental mode of the resonator, wherein the frequency and the number of the net flowing photons adjust to the resonance frequencies which take part. The typical thermalisation processes for electromagnetic radiation in interaction with the resonator walls usually present only a small conversion potential for the Bose-Einstein condensation of photons.

SUMMARY OF THE INVENTION

The object of the present invention lies in avoiding the disadvantages of that which is known, in particular to provide a device where photons in the vicinity of a certain frequency, to a greatest extent as possible convert into photons in the region of a predetermined target frequency, wherein the target frequency is smaller than the initial frequency and the photons may be subjected to the modes of a Bose-Einstein condensation so that they may spontaneously flow from the vicinity of the initial frequency into the region of the target frequency which is the fundamental frequency of an electromagnetic resonator.

According to the invention this object is achieved with a device as described below.

Quantum statistical fundamentals

In a stationary flow equilibrium in a photon gas one may create a thermodynamic equilibrium in that the average photon energy density and the average photon number density are fixed independently of one another. This may for example be effected in that with an electromagnetic resonator the wall temperature is fixed whilst with a laser, photons are radiated in. By way of the mutually independent variation of the power and of the frequency of the laser a stationary photon accumulation may be built up whose parameters—average photon number and average photon energy—in pairs, may be set independently of one another. Also the free manipulation of the wall temperature and of the laser power or of the wall temperature and of the laser frequency for this are considered. In place of a laser, also by way of a heat radiation of a suitable temperature which is radiated into the resonator through a long-wave pass filter, there may be created a desired stationary deviation from Plancks's heat radiation.

Mathematically such a photon gas may be described by way of a so-called "grand canonical ensemble" with an indefinite particle number with the two Lagrange parameters β=1/(kT) and $\mu$, with inverse temperature and chemical potential. For the energy density of this free boson gas there applies:

$$\begin{aligned} u(\beta, \mu) &= V^{-1} \sum_{k=1,2,\ldots} \varepsilon_k \left(e^{\beta(\varepsilon_k-\mu)} - 1\right)^{-1} \\ &= V^{-1}\varepsilon_1\left(e^{\beta(\varepsilon_1-\mu)} - 1\right)^{-1} + V^{-1} \sum_{k=2,3,\ldots} \varepsilon_k\left(e^{\beta(\varepsilon_k-\mu)} - 1\right)^{-1} \end{aligned} \tag{1}$$

$\epsilon k$, k=1,2. . . stands for the energy value of the resonator, V for the volume. The second term of the second fine which sums up the energy of all excited modes, for sufficiently "large" cavities tends towards $$\begin{aligned} u_e(\beta, \mu) &= 6\beta^{-4}('hc)^{-3}\pi^{-2}g_4(e^{\beta\mu}), \\ g_\alpha(z) &= \sum_{n=1,2,\ldots} z^n n^{-\alpha}, \end{aligned} \tag{2}$$

'h stands for Planck's constant h divided by 2π. The parameters β and $\mu$ are solutions to the equation system $$\begin{aligned} u(\beta,\mu) &= u \\ \rho(\beta,\mu) &= n \end{aligned} \tag{3}$$

wherein u indicates the value of the set energy density and n the value of the set photon number. The photon number density ρ as a function of β and $\mu$ is given by $$\begin{aligned} \rho(\beta, \mu) &= V^{-1} \sum_{k=1,2,\ldots} \left(e^{\beta(\varepsilon_k-\mu)} - 1\right)^{-1} \\ &= V^{-1}\left(e^{\beta(\varepsilon_1-\mu)} - 1\right)^{-1} + V^{-1} \sum_{k=2,3,\ldots} \left(e^{\beta(\varepsilon_k-\mu)} - 1\right)^{-1} \end{aligned} \tag{4}$$

For sufficiently large cavities the second term in (4), the term of the excited modes results in $$\rho_e(\beta,\mu)=2\beta^{-3}('hc)^{-3}\pi^{-2}g_3(e^{\beta\mu}) \tag{5}$$

For the chemical potential there applies $$\mu \leqq \epsilon 1 \tag{6}$$

so that the occupation probabilities occuring in (4) may not become negative.

With an increasing size of the cavity, $\epsilon 1$ reciprocally to the characteristic "diameter" tends to 0. In the limit case of infinitely large cavities $\mu$ is negative or equal to 0. If $\mu$ equal to 0 excited modes absorb the maximum energy density $$uc(\beta):=ue(\beta,0) \tag{7}$$

This is the energy density of the black body radiation. If there is set an energy density u which exceeds this value, the energy excess must be taken up by the fundamental mode, the first term in (1). In the ideal case of an infinitely large cavity, i.e. for each sufficiently large cavity, in a good approximation there then applies $$V^{-1}\epsilon 1(e^{\beta(\epsilon 1-\mu)}-1)^{-1}=\underline{u}-u_{c}(\beta) \quad (8)$$

Expanding the exponential function on the left side in $$V^{-1}\epsilon_1(\epsilon_1-\mu)^{-1}\beta^{-1} \quad (9)$$

then it is obvious that $\mu-\epsilon 1$ reciprocally to the fourth power of the characteristic diameter of the cavity tends to 0.

If the fundamental mode energy is different to 0, which means that, the fundamental mode is occupied macroscopically, the photon number in the fundamental mode, thus the first term in (4), becomes singular in that it increases proportionally to the diameter of the cavity. This is plausible since an infinitely large number of photons of infinitesimal energy gives a finite energy term. This is precisely the infrared singularity.

On the Mechanism of the Redistribution of Photons

Bose-Einstein condensation of photons means that the photons exceeding the critical energy density uc(β) transfer into the fundamental mode of the resonator. This is possible by the interaction of the photons with the wall of the resonator. Since the quality factor of the cavity has a finite value a broadening of the resonances and thus an overlapping of the resonance curves result. This implies non-zero transition probabilities between the resonances. A cavity which suits for photon condensation may be designed such that the transition probabilities dominate the absorption probabilities.

Ignoring the Frequency Shift $$f_k(t)\propto e^{i\omega_k t-\omega_k t/(2Q_k)} \quad (10)$$

is the photon function in the resonance k taking into account the damping. The quality factor Q is, up to a geometric factor of the order 1, given by (see John David Jackson, Classical Electrodynamics, Second Edition, John Wiley & Sons, New York, 1975, p. 359)

$$Q_k=(\mu_0\sigma\omega_k/2)^{1/2}V/A \quad (11)$$

σ is the conductivity of the wall material, $\mu 0$ the magnetic permeability of the vacuum, V the volume and A the surface area of the cavity. The Fourier transform of (10) is $$f_k(\omega)\propto(-i(\omega-\omega_k)-\omega_k/(2Q_k))^{-1}=(-i(\omega-\omega_k)-\alpha\omega^{1/2})^{-1}, \quad (12)$$
$$\alpha=(2\mu_0\sigma)^{-1/2}A/V$$

The probability amplitude for a transition ωk→ω1 is $$Ta(\omega_k,\omega_l,\alpha)=\int_0^\infty f_k(\omega)f_l^{cc}(\omega)\,d\omega\left(\int_0^\infty f_k(\omega)f_k^{cc}(\omega)\,d\omega\right)^{-1/2}\left(\int_0^\infty f_l(\omega)f_l^{cc}(\omega)\,d\omega\right)^{-1/2} \quad (13)$$

fcc denotes the conjugate complex of the function f. The transition probability results from the multiplication of the probabaility amplitude by its conjugate complex to $$Tp(\omega_k,\omega_l,\alpha)=\{(\pi+\mathrm{Arc\ Tan}[\omega_k^{1/2}/\alpha]+\mathrm{Arc\ Tan}[\omega_l^{1/2}/\alpha])^2+4^{-1}\mathrm{Log}[(\omega_k\alpha^2+\omega_k^2)/(\omega_l\alpha^2+\omega_l^2)]\}^{}(\mathrm{Arc\ Tan}[\omega_k^{1/2}/\alpha]+\pi/2)^{-1}(\mathrm{Arc\ Tan}[\omega_l^{1/2}/\alpha]+\pi/2)^{-1}((\omega_k^{1/2}+\omega_l^{1/2})^2\omega_k^{-1/2}\omega_l^{-1/2}+(\omega_k-\omega_l)^2\alpha^{-2}\omega_k^{-1/2}\omega_l^{-1/2})^{-1} \quad (14)$$

For frequencies close to one another, i.e. if x=ωk−ωl is small, then approximately $$Tp[\omega,\omega+x,\alpha]\approx\{4-(x/\omega)(\alpha^2+2\omega+x)/(4\pi^2(\alpha^2+\omega))\}^{**}(4+x^2\omega^{-1}\alpha^{-2})^{-1} \quad (15)$$

This transition probability is close to 1 if $$x2\omega-1\alpha-2<1 \quad (16)$$

This may be exploited as a design criterium for a resonator for the photon condensation.

Example of cuboidal cavity: b<a<1

(see e.g. Peter A. Rizzi, Microwave Engineering—Passive Circuits,. Prentice Hall, Engelwood Cliffs, N.J., 1988)

$$v_{m,n,p}=\omega_{m,n,p}/(2\pi)=c2^{-1}((m/a)^2+(n/b)^2+(p/l)^2)^{1/2} \quad (17)$$

The lowest energy inherent eigen value is $$v_{1,0,1}=(c/2)(a^{-2}+1^{-2})^{1/2} \quad (18)$$

and the difference between two neighbouring resonances in the lower frequency region where their maximum is to be expected is $$\begin{aligned} x &= \omega_{1,0,p+1}-\omega_{1,0,p} \\ &= \pi c\left\{(a^{-2}+((p+1)/l)^2)^{1/2}-(a^{-2}+(p/l)^2)^{1/2}\right\} \\ &= \pi(c/a)2^{-1}(2p+1)(a/l)^2\left(1+p^2(a/l)^2\right)^{-1/2} \end{aligned} \quad (19)$$

For calculating the maximum value of x2/ω in (16) the maximum value of the factor $$(2p+1)^2(1+p^2(a/l)^2)^{-3/2}$$

is computed which is reached for $$p=-3/4+(9/16+2(l/a)^2)^{1/2}\approx 2^{1/2}l/a \quad (20)$$

For the cuboid there thus results the design criterium (16) approximately $$x^2\omega^{-1}\alpha^{-2}\approx\pi c\mu_0\sigma{*}2{*}3^{-3/2}{*}a{*}l^{-2}{*}(l^{-1}+a^{-1}+b^{-1})^{-2} \quad (21)$$

In the case that b is small with respect to a and l there results in SI units for (21) the approximation $$228\sigma ab^2l^{-2} \quad (22)$$

Example of a circular cylinder: (Jackson p.356)

R: circular radius d: height

ϵ: dielectricity constant $\mu$: magnetic permeability $$\omega_{m,n,p}=(\mu\epsilon)^{-1/2}(x'_{mn}{}^2R^{-2}+p^2\pi^2d^{-2})^{1/2}=(\mu\epsilon)^{-1/2}x'_{mn}R^{-1}(1+R^2p^2\pi^2/(dx'_{mn})^2)^{1/2} \quad (23)$$

x'mn, the root of J |m(x) assumes the following values:

| | | | |
|---|---|---|---|
| m = 0 | x'0n = 3.832 | 7.016 | 10.173 |
| m = 1 | x'1n = 1.841 | 5.331 | 8.536 |
| m = 2 | x'2n = 3.054 | 6.706 | 9.970 |
| m = 3 | x'3n = 4.201 | 8.015 | 11.336 |
| . . . | | | |

For estimating the maximal distance of two resonances which accordingly entails the most unfavourable transition probability we approximatively compute the difference according to the series expansion of the root and obtain $$\begin{aligned}\omega_{1,1,p+1}-\omega_{1,1,p} &= cx'_{1,1}R^{-1}2^{-1}(2p+1)R^2\pi^2/(dx'_{1,1})^2 \\ &\quad (1+R^2p^2\pi^2/(dx'_{11})^2)^{-1/2} \\ &= (2p+1)(1+R^2p^2\pi^2/(dx'_{11})^2)^{-1/2} \\ &\quad 2^{-1}c\pi^2x'^{-1}_{11}Rd^{-2}\end{aligned} \quad (24)$$

With x=ω1,1, p+1−ω1,1,p one calculates the left side in the design criterium (16). In order to estimate the most unfavourable case one determines the maximum of $$(2p+1)^2(1+R^2p^2\pi^2/(dx'_{11})^2)^{-3/2}$$

for $$p=-(3/4)+((9/16)+2(x'_{11}/\pi)^2(d/R)^2)^{1/2}\approx 2^{1/2}(x'_{11}/\pi)(d/R)$$

wherein the last approximation applies when the cylinder height d is large compared to the circular diameter R. For the circular cylinder the design criterium (16) thus results in $$x^2\omega^{-1}\alpha^{-2}\approx\pi^2 3^{-3/2}\, x'_{11}{}^{-1}c\mu_0\sigma Rd^{-2}(d^{-1}+R^{-1})^{-2}\approx 389\sigma R^3d^{-2} \quad (25)$$

the last approximation is again to be understood in SI units.

Absorption in Competition With the Photon Transitions Between the Resonances

A mechanism for the net redistribution of photons of higher frequencies into photons of lower frequencies as is necessary for a Bose-Einstein condensation of photons is possible when the transition probabilities between the resonances are always greater than the absorption probabilities. According to (12) with the normalisation factor N, the form function of the resonance k results in $$|f_k(\omega)|^2=N^{-2}((\omega-\omega_k)^2+\omega_k{}^2(2Q_k)^{-2})^{-1} \quad (26)$$

The form function (26) for ωk assumes the maximum value $$|f_l(\omega_k)|^2=N^{-2}\omega_k{}^{-2}(2Q_k)^2 \quad (27)$$

The half width follows from $$|f_k(\omega)|^2=2^{-1}N^{-2}\omega_k{}^{-2}(2Q_k)^2 \quad (28)$$

to $$2(\omega-\omega_k)=\omega_k/Q_k \quad (29)$$

The decay time Qk/ωk substituted into the photon function (10) indicates how long it lasts until the resonance decays to the e. part. I.e. after $$Q_k/\omega_k \quad (30)$$

seconds the absorption probability of the photons of a resonance is $$l-e^{-1}=63.2\% \quad (31)$$

The decay time (30) simultaneously gives the time scale for photon transitions between the resonances.

Criterium: If all transition probabilities between neighbouring resonances of a resonator are larger than (31) there results a redistribution excess.

According to the invention the device serves the controlled achieving of a photon flow between a selected resonance of an electromagnetic resonator and a selected target resonance of the resonator, wherein this photon flow in particular supports the redistribution of electromagnetic radiation between the resonances of the resonator with the production of a Bose-Einstein photon condensate. It consists essentially of a cavity with reflecting walls and of means for coupling electromagnetic radiation into the cavity, wherein the means are designed in a manner such that the average energy density of the electromagnetic radiation reaches a value which is larger than the critical energy density $$ucrit(\beta):=ue(\beta,0)$$

at the average, effectively set temperature T of the radiation in the resonator.

With this β=1/(kT), k is the Boltzmann constant, $$u_e(\beta,\mu)=6\beta^{-4}('hc)^{-3}\pi^{-2}g_4(e^{\beta\mu}),$$

$$g_\alpha(z)=\sum_{n=1,2,\ldots} z^n n^{-\alpha},$$

'h the Planck's constant divided by 2π. The parameters β and $\mu$ are determined by the solution of the equation system $$u(\beta,\mu)=u$$

$$\rho(\beta,\mu)=n$$

where u denotes the value of the set energy density and n the value of the photon number density which set is (see e.g. Res Jost, Quantenmechanik II, Verlag der Fachvereine der ETZH Zürich, 1973, p. 151 ff.). Via this equation system the variables u and n are implicitly related to the temperature. For example it is technically comfortable to observe the average energy density u and the effective temperature T of the radiation as independent variables.

The coupled-in electromagnetic waves initially occupy the cavity modes with the respective frequencies.

According to the invention the device is designed such that the transition probability for the transition of photons between neighbouring modes in the range between the initial resonance frequencies and the target resonance frequency is larger than the probability for the absorption of photons. In particular this may be achieved by the selection of the reflectivity of the walls of the cavity, the shape of the cavity, the size of the cavity or also by way of a medium incorporated into the cavity.

The advantage of this device lies in the fact that the redistribution procedure of photons via the resonance modes of a cavity may be controlled and direct influenced and no longer remains dependent on accidental thermalisation processes. This device thus simplifies the Bose-Einstein condensation of photons. In its application as a solar cell, as this is described in WO 87/01503, with the redistribution device for photons described here also the efficiency for producing the useful, laser-like ground state may be controlled and in particular increased in a targeted manner.

BRIEF DESCRIPTION OF THE DRAWINGS

The invention is hereinafter schematically explained in embodiment examples and by way of the drawings, wherein:

FIG. 1 shows schematically a cuboidal resonator of the width a, the height b and the length l.

FIG. 2 shows schematically a cylindrical resonator with a circular cross section with radius R and a cylinder height d.

FIG. 3 shows schematically a glass rod suitably mirrored at the ends, as an example of a dielectric resonator with a circular cross section with radius R and rod length d.

FIG. 6 shows schematically an approximately 2-dimensional resonator with a fractal boundary which may for example be manufactured by way of ion-beam implantation in a semiconductor ("nanotechnology").

FIG. 7 shows schematically a resonator with a stadium-shaped cross section.

DESCRIPTION OF THE PREFERRED EMBODIMENT(S)

Figure 4:
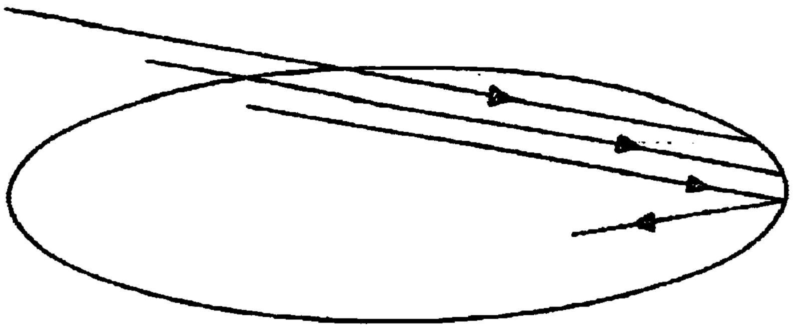
FIG. 4 shows schematically an approximately 2-dimensional resonator into which radiation is coupled, for example via a suitable prism.
Figure 5:
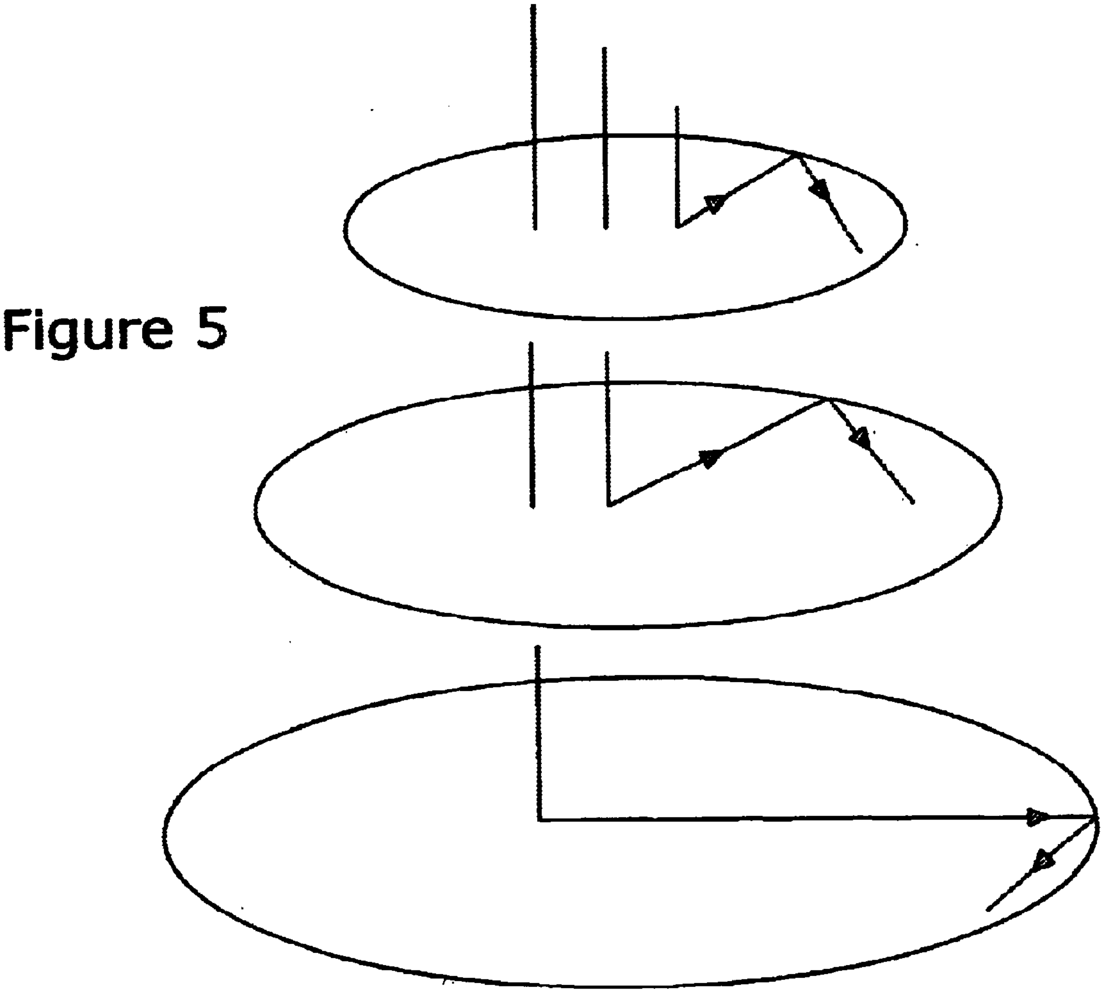
FIG. 5 shows schematically a cascade of approximately 2-dimensional resonators whose size increases from the top to the bottom.
Figure 8:
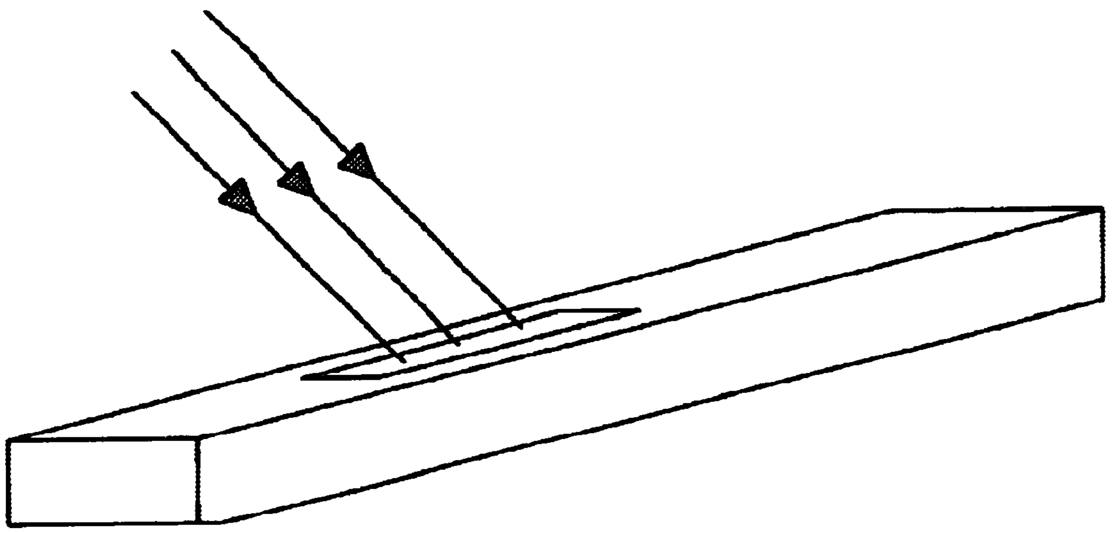
FIG. 8 shows schematicallly a resonator with a long wave pass filter installed into the wall.

Production of a Overcritical Photon Density by way of a Stationary Flow Equilibrium The following refers to an electromagnetic resonator with volume V and surface area A. Through an opening of size A2 photons are radiated into the resonator. A1=A−A2 is the remaining resonator wall, with wall temperature T1 and average absorption AB. The radiated-in photon flow is denoted by J, the radiated-in photon power by P. The energy radiation into the resonator is thus $$\sigma T_1^4 A_1 AB+P \qquad (32)$$

The first term represents the radiation of the wall into the resonator cavity, wherein σ here denotes the Stefan-Boltzmann constant. The average free path length which a photon travels between two reflections is $$4\ V/A \qquad (33)$$

E(t) shall denote the actual radiation energy in the cavity. The radiation power hitting the wall results from the energy E(t) which during the free running time (4V/A)/c on average impinges the wall once. With this the absorbed power is $$E(t)c(4\ V/A)^{-1}AB(A_1/A)+E(t)c(4\ V/A)^{-1}A_2/A \qquad (34)$$

With (32) and (34) there results the differential rate equation for the radiation energy in the resonator $$dE=\sigma T_1^4 AB\ A_1 dt+Pdt-c(AB\ A_1+A_2)(4\ V)^{-1}E dt \qquad (35)$$

Integration yields the solution $$E(t)=(\sigma T_1^4 AB\ A_1+P)c^{-1} 4\ V(AB\ A_1+A_2)^{-1} ** (1-e^{-c(4\ V)^{-1}(ABA_1+A_2)t}) \qquad (36)$$

Accordingly there results for the photon number in the resonator cavity $$N(t)=(\sigma T_1^3 g_3(1)(3k\ g_4(1))^{-1} AB\ A_1+J)c^{-1} 4\ V(AB\ A_1+A_2)^{-1} ** (1-e^{-c(4V)^{-1}(ABA_1+A_2)t}) \qquad (37)$$

The two function values of the Riemanns's Zeta function are $$g3(1)=1.202 \text{ and } g4(1)=\pi 4/90$$

The equilibrium values of the energy density E(∞)/V and of the photon number density N(∞)/V which in an approximative manner result very rapidly, are respectively $$u(T_1,P)=(4/c)(\sigma T_1^4 AB\ A_1+P)(AB\ A_1+A_2)^{-1} \qquad (38)$$

$$\rho(T_1, J)=(4/c)(\sigma T_1^3 g_3(1)(3k\ g_4(1))^{-1} AB\ A_1+J)(AB\ A_1+A_2)^{-1} \qquad (39)$$

A small thermometer in equilibrium with the radiation would register an average photon energy and accordingly indicate the following temperature T:

$$u(T_1,P)/\rho(T_1,J)=3kTg_4(1)/g_3(1) \qquad (40)$$

This average temperature T of the radiation phase implies a critical energy density, the energy intensity of the black body radiation $$\begin{aligned} u_c(T) &= (4/c)\sigma T^4 \qquad (41) \\ &= (4/c)\sigma g_3(1)^4 (3kg_4(1))^{-4} (u/\rho)^4 \end{aligned}$$

Condensation occurs in the case that $$u/u_c(T)>1 \qquad (42)$$

i.e. in the case $$(c/4)\sigma^{-1}(3k\ g_4(1)/g_3(1))^4 u^{-3}\rho^4>1 \qquad (43)$$

(38) and (39) subsitituted into (43) yields as a condensation criterium a relationship between the wall temperature T1, the photon flow J and the photon power P:

$$\sigma^{-1}(AB\ A_1+A_2)^{-1}(\sigma T_1^3 AB\ A_1+J(3k\ g_4(1)/g_3(1)))^4(\sigma T_1^4 AB\ A_1+P)^{-3}>1 \qquad (44)$$

Production of the Overcritical Photon Density by way of "cut-off" Heat Radiation Through a long wave pass filter in the opening A2 heat radiation of the temperature T2 is focussed into the resonator, wherein T2>T1. Photons with wavelengths larger than λG are let through, those with a smaller wavelength may not pass.

The integral representation of the energy density and the photon number density of black body radiation is given by $$u_c(T) = (kT)^4 (hc)^{-3} 8\pi \sum_{n=1}^{\infty} \int_0^{\infty} x^3 e^{-nx}\, dx \qquad (45)$$

$$\rho_c(T) = (kT)^3 (hc)^{-3} 8\pi \sum_{n=1}^{\infty} \int_0^{\infty} x^2 e^{-nx}\, dx \qquad (46)$$

Cutting off all photon frequencies larger than υG (or all wavelengths smaller than λG) yields the truncated energy and photon number densities $$u_{tr}(T,a_G)=(kT)^4(hc)^{-3}8\pi\sum_{n=1}^{\infty}\int_0^{a_c}x^3e^{-nx}\,dx \tag{47}$$

$$\rho_{tr}(T,a_G)=(kT)^3(hc)^{-3}8\pi\sum_{n=1}^{\infty}\int_0^{a_c}x^2e^{-nx}\,dx \tag{48}$$

$$\text{with}\quad a_G=h(kT)^{-1}v_G=hc(kT)^{-1}\lambda_G^{-1} \tag{49}$$

The truncated heat radiation radiated into the resonator has a power $$P=(c/4)A_2\{u_{tr}(T_2,a_G)+u_c(T_1)-u_{tr}(T_1,a_G)\} \tag{50}$$

The first term in the curly brackets stands for the truncated heat radiation radiated from the heat source of the temperature T2. The filter assumes the same temperature T1 as the resonator wall. However the let-through frequencies do not take part in the thermal equilibrium between the radiation and the filter. From the second term in the curly brackets which stands for the characteristic radiation of the filter, the let-through frequencies must be subtracted which is managed by the last term. The photon current into the resonator cavity is, accordingly $$J=(c/4)A_2\{\rho_{tr}(T_2,a_G)+\rho_c(T_1)-\rho_{tr}(T_1,a_G)\} \tag{51}$$

(50) and (51) substituted into (38) and (39) yields $$u=u_c(T_1)+f_2{*}(u_{tr}(T_2,a_G)-u_{tr}(T_1,a_G)) \tag{52}$$

$$\rho=\rho_c(T_1)+f_2{*}(\rho_{tr}(T_2,a_G)-\rho_{tr}(T_1,a_G))$$

$$f_2:=A_2{*}(AB\ A_1+A_2) \tag{53}$$

These equations substituted into the condensation mode (43) yield $$u/u_c=\{1+f_2{*}((T_2/T_1)^3{*}r_\rho(T_2,a_G)-r_\rho(T_1,a_G))\}^{4}{**}\{1+f_2{*}((T_2/T_1)^4{*}r_u(T_2,a_G)-r_u(T_1,a_G))\}^3 \tag{54}$$

wherein $r_\rho(T,a):=\rho_{tr}(T,a)/\rho_c(T)$ and $r_u(T,a):=u_{tr}(T,a)/u_c(T)$ Photon Condensation by Way of Microwave Injection With a Transmitter Into an electromagnetic resonator with the fundamental frequency υ1 there is coupled a transmitter set to the frequency υs>υ1. When a redistribution of photons of a higher frequency into photons of a lower frequency is guaranteed and the photon gas according to mode (42) becomes overcritical, the Bose-Einstein condensation of photons sets in. For the sake of calculation simplicity we will assume a sharp transmitter frequency υs. Between the power P and the photon flow J there then exists the relationship $$J=P/(hv_S) \tag{55}$$

Substituting this relationship into the left hand side of the condensation relation (44) which we as a function of the coupled-in transmitter power P, of the transmitter frequency υs, of the resonator wall temperature T1, of the average absorption coefficient AB, of the coupling-in opening A2 and of the residual area A1 of the resonator denote as Cr(P,υs,T1,AB,A1,A2), yields $$Cr(P,v_s,T_1,AB,A_1,A_2)=(\sigma T_1^{\,3}AB\ A_1+P(hv_s)^{-1}3k(g_4(1)/g_3(1)))^{4}{**}(\sigma T_1^{\,4}AB\ A_1+P)^{-3}\sigma^{-1}(AB\ A_1+A_2)^{-1} \tag{56}$$

As a concrete resonator model we regard a circular cylinder. The fundamental frequency is given by $$\omega_{111}=(\mu\epsilon)^{-1/2}x'_{11}R^{-1}(1-R^2\pi^2/(dx'_{11})^2)^{1/2} \tag{57}$$

For ensuring the redistribution mechanism of the photons according to (25) the following must apply $$389\sigma_LR^3d^{-2}<1 \tag{58}$$

In contrast to the Stefan-Boltzmann constant, the conductivity coefficient shall be written with an index L. For fullfilling (58) the length of the cylinder will be much greater than its radius so that according to (57) as a good approximation $$\omega_{111}\approx(\mu\epsilon)^{-1/2}x'_{11}R^{-1} \tag{59}$$

Thus from (58) in SI units there results $$d>(389\sigma_L)^{-1/2}(\mu\epsilon)^{-3/4}(x'_{11}/\omega_{111})^{3/2} \tag{60}$$

If one limits the length d of the cavity and as a material uses steel, one obtains with a conductivity of σL=1.1*106 Ohm−1 m−1 and with ε=ε0 and μ=μ0, from (60), the following frequencies:

| | | |
|---|---|---|
| d = 2.0 m: | υ111 > 41.728 GHz | R < 2.107*10-3 m |
| d = 2.5 m: | υ111 > 35.960 GHz | R < 2.444*10-3 m |
| d = 3.0 m: | υ111 > 31.844 GHz | R < 2.76*10-3 m |
| d = 3.5 m: | υ111 > 28.734 GHz | R < 3.059*10-3 m |
| d = 4.0 m: | υ111 > 26.287 GHz | R < 3.34*10-3 m |

The explicit calculation shows that a parameter configuration of d=1.7 m and R=2.44 mm which corresponds to a fundamental frequency of exactly 36 GHz results in a minimal transition probability still lying just above the absorption probability.

For the case of a circular cylinder resonator of steel with the height d=2.5 m and the radius R=2.44 mm one determines from the condensation mode (44) a combination of the values for the transmitter power and transmitter frequency which leads to photon condensation. With this one sets a wall temperature of 300 K. For this resonator there apply the following data (SI-units):

| | |
|---|---|
| (61) | |
| A1 = 0 | |
| A2 = 2πRd + 2πR2 = 0.038365 | |
| AB = (8ωε0/σL)1/2 > 0.003815; | average value for the computation |
| AB = 0.005 | |

For the transmitter frequency one assumes 40 GHz. By way of the condensation function (56) one seeks values for the transmitter power, for which the function value of Cr becomes larger than 1. Then condensation occurs. There results:

*Cr*(10−3, 40*109, 0.005, 0.038365, 0)=1087

*Cr*(10−3, 40*109, 0.005, 0.038365, π10−6)=1070

*Cr*(10−4, 40*109, 0.005, 0.038365, π10−6)=4.69

*Cr*(10−5, 40*109, 0.005, 0.038365, π10−6)=1.17

*Cr*(10−6, 40*109, 0.005, 0.038365, π10−6)=1.0028

*Cr*(10−7, 40*109, 0.005, 0.038365, π10−6)=0.986 (62)

For transmitter powers of 1 mW to 1 μW condensation occurs. The difference between the two first rows in (62) shows the effect of the small opening in the resonator of 1 mm radius.

For the case of a copper tube (σL=5.8*107 Ohm−1 m−1) with the same radius which is closed to a resonator, the redistribution mode (60) would demand a length of approx. 18 m, for a brass tube (σL=1.5*107 Ohm−1 m−1), of approx. 9 m. The explicit computation gives as lower limits 12 and 6.5 m respectively. The condensation criterium is fullfilled in each case for the same transmitter power as with the circular cylinder tube of steel.

For a cuboidal resonator an assumed fundamental frequency of 36 GHz implies a width of a=4.167 mm. With b=2.08 mm the redistribution criterium according to the computation for steel demands a length of at least 1 m, for brass 2.6 m and for copper 4 m. The condensation criterium is in each case again fullfilled for transmitter powers of greater than 1 μW with a transmitter frequency of 40 GHz.

Cavity With a Dielectric Medium

Taking account of a dielectricity constant εr different from 1 the redistribution criterium (16) is modified and for cuboidal cavities according to (22) yields $$228\sigma L\ \epsilon r-1\ a\ b2\ 1-2<1 \tag{63}$$

and for a circular cylinder according to (25)

$$389\sigma L\epsilon r-1R3d-2<1 \tag{64}$$

Photon Condensation by Way of Long Wave Pass Filtered Heat Radiation

In the second main example for realising photon condensation the deviation from the Planck distribution of electromagnetic radiation is to be realised by way of suitable frequency selection of a heat radiation of a temperature T2 fed into a resonator with a fixed wall temperature T1 (Reference from Armin Zastrow, ISE, Freiburg). In an opening of the resonator cavity whose area content is again indicated with A2, there is applied a long wave pass filter which only lets through electromagnetic radiation with wavelengths larger than λG or with frequencies smaller than υG=c/λG. The filter itself is at wall temperature. If its transmission for long-wave radiation is different from 1, this amounts to a smaller A2 so that this variable accordingly is to be interpreted as an effective variable. According to (50) this would imply that also the absorption for short-wave radiation is assumed to deviate from 1 to the same extent. A possibly occuring difference would have an extremely slight influence as long as A2 is not too large with respect to the remaining resonator wall A1.

If the redistribution mode is fullfilled, condensation commences when u/uc>1. Grouping together the right side of (54) into a function of the variables T1, T2, a, b, l, A2, λG, σL (65)

Crtrunc (T1,T2,a,b,1,A2,λG,σL)

| | |
|---|---|
| T1: | wall temperature of the resonator |
| T2: | temperature of the heat radiator |
| a: | width |
| b: | height |
| 1: | length of the cuboidal resonator b < a < 1 |

-continued

| | |
|---|---|
| A2 | area of the filter opening |
| λG | edge of the long wave pass filter |
| σL | conductivity of the wall material |

The dependence of the right hand side in (54) of a, b, c results via the area $$A1=A-A2=2(al+bl+ab)-A2 \tag{66}$$

and, as the dependency on the conductivity, via the absorption coefficient AB. A1, A2 and AB are grouped together into the effective area quotient f2. The limit wavelength λ, the filter edge, is according to (49) contained in the coefficient aG. In the following a few typical, realisable parameter configurations are put forward. As a criterium for the transition probability Ta with the computer calculation refers to a value larger than 70%.

1st case: The fundamental frequency of the resonator is to be 9 GHz in order to exploit the particularly convenient sensitivity with regard to measuring technology The setting is realized by a = 0.0167 m. For cavities of steel with σL = 1.1*106 Ohm-1 m-1, of brass with σL = 1.5*107 Ohm-1 m-1 and of copper with σL = 5.8*107 Ohm-1 m-1 there result from the redistribution criterium (63) the following approximations for the combination possibilities of 1 and b

| | approximation | calculation | |
|---|---|---|---|
| steel | 1/b > 2047 | b = 1 mm ⇒ | 1 > 1.5 m |
| | | b = 2 mm ⇒ | 1 > 2.8 m |
| | | b = 3 mm ⇒ | 1 > 4.0 m |
| | | b = 4 mm ⇒ | 1 > 5.1 m |
| | | b = 5 mm ⇒ | 1 > 6.1 m |
| brass | 1/b > 7558 | b = 1 mm ⇒ | 1 > 5.5 m |
| copper | 1/b > 14861 | b = 1 mm ⇒ | 1 > 10.8 m |

For the above parameter configurations the condensation function (65) for a wall temperature of T1=300 K and a radiating-in temperature of T2=1000 K assumes the following values Crtrunc (300K, 1000K, 1.67 cm, 1 mm, 1.5 m, 1.44 cm2, 8.4 μm, 1.1*106 Ω−1 m−1)=1.058

Crtrunc (300K, 1000K, 1.67 cm, 2 mm, 2.8 m, 1.44 cm2, 8.4 μm, 1.1*106 Ω−1 m−1)=1.030

Crtrunc (300K, 1000K, 1.67 cm, 3 mm, 4.0 m, 1.44 cm2, 8.4 μm, 1.1*106 Ω−1 m−1)=1.018

Crtrunc (300K, 1000K, 1.67 cm, 4 mm, 5.1 m, 1.44 cm2, 8.4 μm, 1.1*106 Ω−1 m−1)=1.013

Crtrunc (300K, 1000K, 1.67 cm, 5 mm, 6.1 m, 1.44 cm2, 8.4 μm, 1.1*106 Ω−1 m−1)=1.009

Crtrunc (300K, 1000K, 1.67 cm, 1 mm, 5.5 m, 1.44 cm2, 8.4 μm, 1.5*107 Ω−1 m−1)=1.058

Crtrunc (300K, 1000K, 1.67 cm, 1 mm, 10.8 m, 1.44 cm2, 8.4 μm, 5.8*107 Ω−1 m−1)=1.058

For the first set of parameters this means that the critical energy density is exceeded by 5.8%, for the second by 3% etc. If the temperature is varied the photon gas remains critical for temperatures which are not too high. For lower temperatures the "criticity" reduces, towards higher ones it firstly increases. For the first set of parameters the temperature dependency looks like the following:

Crtrunc (300K, 400K, 1.67 cm, 1 mm, 1.5 m, 1.44 cm2, 8.4 μm, 1.1*106 Ω−1 m−1)=1.015

Crtrunc (300K, 600K, 1.67 cm, 1 mm, 1.5 m, 1.44 cm2, 8.4 μm, 1.1*106 Ω−1 m−1)=1.033

Crtrunc (300K, 800K, 1.67 cm, 1 mm, 1.5 m, 1.44 cm2, 8.4 μm, 1.1*106 Ω−1 m−1)=1.044

Crtrunc (300K, 1000K, 1.67 cm, 1 mm, 1.5 m, 1.44 cm2, 8.4 μm, 1.1*106 Ω−1 m−1)=1.058

Crtrunc (300K, 1200K, 1.67 cm, 1 mm, 1.5 m, 1.44 cm2, 8.4 μm, 1.1*106 Ω−1 m−1)=1.076

Crtrunc (300K, 1400K, 1.67 cm, 1 mm, 1.5 m, 1.44 cm2, 8.4 μm, 1.5*107 Ω−1 m−1)=1.098

Crtrunc (300K, 1600K, 1.67 cm, 1 mm, 1.5, 1.44 cm2, 8.4 μm, 5.8*107 Ω−1 m−1)=1.125

2nd case: a is dimensioned such that the filter covering does not exceed approx. 2/3 of the width of the cavity. The effective dimension of the filter is 18 mm*8 mm
This makes obvious the following choice:
a = 0.0125 m and A2 = 1.44*10-4m2,
understood as an effective value.
The fundamental frequency is then 12 GHz.
The actual filter data are 20 mm * 9.14 mm
λG = 8.4 μm
transmission = 82%
(guaranteed up to approx. 15 μm)

| | approximation | calculation | |
|---|---|---|---|
| steel | 1/b > 1771 | b = 1 mm ⇒ | 1 > 1.3 m |
| | | b = 2 mm ⇒ | 1 > 2.4 m |
| | | b = 3 mm ⇒ | 1 > 3.3 m |
| | | b = 4 mm ⇒ | 1 > 4.1 m |
| | | b = 5 mm ⇒ | 1 > 4.9 m |
| brass | 1/b > 6539 | b = 1 mm ⇒ | 1 > 4.7 m |
| copper | 1/b > 12857 | b = 1 mm ⇒ | 1 > 9.1 m |

The condensation function values for the various parameter configurations are now:

Crtrunc (300K, 1000K, 1.25 cm, 1 mm, 1.3 m, 1.44 cm2, 8.4 μm, 1.1*106 Ω−1 m−1)=1.099

Crtrunc (300K, 1000K, 1.25 cm, 2 mm, 2.4 m, 1.44 cm2, 8.4 μm, 1.1*106 Ω−1 m−1)=1.048

Crtrunc (300K, 1000K, 1.25 cm, 3 mm, 3.3 m, 1.44 cm2, 8.4 μm, 1.1*106 Ω−1 m−1)=1.030

Crtrunc (300K, 1000K, 1.25 cm, 4 mm, 4.1 m, 1.44 cm2, 8.4 μm, 1.1*106 Ω−1 m−1)=1.020

Crtrunc (300K, 1000K, 1.25 cm, 5 mm, 4.9 m, 1.44 cm2, 8.4 μm, 1.1*106 Ω−1 m−1)=1.015

Crtrunc (300K, 1000K, 1.25 cm, 1 mm, 4.7 m, 1.44 cm2, 8.4 μm, 1.5*107 Ω−1 m−1)=1.102

Crtrunc (300K, 1000K, 1.67 cm, 1 mm, 9.1 m, 1.44 cm2, 8.4 μm, 5.8*107Ω−1 m−1)=1.104

In contrast to case 1 with the same radiating-in intensity the volume has become smaller so that the criticity has increased.

Third case a is selected small, a = 0.004775 m and b = 0.002388 m are fixed (hollow conductor dimension R 500). The fundamental frequency is then 31.414 GHz. The filter size may not be exploited, A2 = 3 mm * 18 mm = 5.4 * 10-5 m2, again understood as an effective value.

| | approximation | calculation | |
|---|---|---|---|
| steel | 1/b > 1095 | 1 > 2.615 m | 1 > 1.4 m |
| brass | 1/b > 4042 | 1 > 9.653 m | 1 > 5.0 m |
| copper | 1/b > 7947 | 1 > 18.978 m | 1 > 9.7 m |

The associated condensation function values are:

Crtrunc (300K, 1000K, 4.775 mm, 2.388 mm, 1.4 m, 0.54 cm2, 8.4 μm, 1.1*106)=1.042

Crtrunc (300K, 1000K, 4.775 mm, 2.388 mm, 5.0 m, 0.54 cm2, 8.4 μm, 1.5*107)=1.044

Crtrunc (300K, 1000K, 4.775 mm, 2.388 mm, 9.7 m, 0.54 cm2, 8.4 μm, 5.8*107)=1.045

Photon Condensation by Way of Optical Injection With a Laser

In place of the injection with microwaves, as in section 6, now the radiating with an optical laser into an electromagnetic cavity is regarded. This is based on a circular cylinder resonator with a diameter of 1 mm (R=5*10−4 m), filled with a dielectric. Specifically one proceeds from a quartz glass with a relative dielectricity constant of εr=4. The fundamental frequency of the resonator with this lies at 87.901 GHz. For ensuring the redistribution criterium (64) d>>R.

Into the glass rod at one end via a semi-permeable mirror there is coupled in a laser. The opposite end is closed by way of a mirror with a high reflectivity. In the glass rod firstly total reflection predominates. The critical angle for the total reflection is 30°. After reflections and scattering on the basis of the geometry and the Fresnel theory the average absorption probability tends towards 30% (see Bergmann-Schafer, Experimental Physics, Volume 3, Optik, Walter de Gruyter, Berlin, 1993). The surface of the glass rod is provided with a inwardly very well reflecting silver coating. In the optical region there results on account of the reflectivity of silver in combination with the total reflection a total absorption probability of less than 2%. This value is assumed in the condensation mode. For applying (64) the high conductivity of silver is used, σL=6.12*107 Ohm−1 m−1. With this the repective estimations lie on the "safe" side.

Under these assumptions the redistribution mode (64) is fullfilled with d>0.863 m The calculation by way of a computer yields the value d>1.32 m for R=0.5 mm (67)

which is used in the following, together with the set of parameters which result using optical glass fibres with a diameter of 50 μm:

d>1.5 cm for R=25 μm (68)

The condensation mode we check here in the form (56). As explained above, here we apply an absorption coefficient of 2%. For the purpose of overview one gives the area A1 as a function of the radius R and of the cylinder length d, A1(R,d). As a laser input we examine the signal frequencies υs, which belong to the laser wavelengths 0.6 μ, including half and quarter frequency values, 1.064 μ including the half frequency value, as well as 10μ.

Cr(17 W, 5*1014 Hz, 300K, 0.02, A1(25 μm, 1.5 cm), π*10–12m2)=1.01988

Cr(7 W, 5*1014 Hz, 300K, 0.02, A1(25 μm, 1.5 cm), π*10–12m2)=0.0601346

Cr(1.1 W, 2.5*1014 Hz, 300K, 0.02, A1(25 μm, 1.5 cm), π*10–12m2)=1.05689

Cr(1 W, 2.5*1014 Hz, 300K, 0.01, A1(25 μm, 1.5 cm), π*10–12m2)=1.92054

Cr(0.5 W, 2.5*1014 Hz, 300K, 0.01, A1(25 μm, 1.5 cm), π*10–12m2)=0.960856

Cr(0.1 W, 1.25*1014 Hz, 300K, 0.02, A1(25 μm, 1.5 cm), π*10–12m2)=1.54448

Cr(1 W, 2.818*1014 Hz, 300K, 0.01, A1(25 μm, 1.5 cm), π*10–12m2)=1.18975

Cr(0.5 W, 1.409*1014 Hz, 300K, 0.02, A1(25 μm, 1.5 cm), π*10–12m2)=4.76229

Cr(10–4 W, 3*1013 Hz, 300K, 0.02, A1(25 μm, 1.5 cm), π*10–12m2)=0.945847

Cr(10–4 W, 3*1013 Hz, 300K, 0.01, A1(25 μm, 1.5 cm), π*10–12m2)=1.37506

Cr(10–3 W, 3*1013 Hz, 300K, 0.02, A1(25 μm, 1.5 cm), π*10–12m2)=5.04832

Cr(1 W, 3*1013 Hz, 300K, 0.02, A1(0.5 mm, 1.32 m), π*10–12m2)=3.05907

A realisation of the condensation mode for a setting 0.6 μ laser and large cavity would demand an extremely high laser output, at least 30 kW. Even after halving the frequency twice, with an absorption of 2%, 120 W would still be necessary. For the small glass fibre cavity after halving the frequency twice also with this laser the condensation threshhold is well achievable (see 6th line).

Since with a 10 μ laser the wavelength is not so distant from the thermic wavelength of 16 μm for 300K, the condensation may already be achieved with a lower power.

Cavities With a Fractal Boundary

In cavities with a fractal boundary (Benoit B. Mandelbrot, The Fractal Geometry of Nature, W. H. Freeman and Company, New York, 1983) one succeeds in a finitely large region of producing a resonator spectrum with infinitely closely lying resonances. Self similar fractal structures may be manufactured on a larger scaling span down to the technical processing limit with the help of the structure-defining algorithms by way of programmable CNC machines. By way of the closely lying resonances there arises a particularly intensive overlapping between neighbouring resonances.

Cavities With a Chaotic Radiation Behaviour

Cavities with an irregular non-integrable resonance spectrum give rise to a chaotic behaviour of the radiation in the resonator. Thus so-called "Stadium geometries" of resonators comprise "quantum-chaos". See e.g.

L. E. Reichl, The transition to Chaos, Springer Publishing House, New York, 1992;

H. A Cerdeira, R. Ramaswamy, M. C. Gutzwiller, G. Casati (Hrg.), Quantum Chaos, World Scientific, Singapore, 1991

With these chaotic turbulent processes in the resonator photon transmission between resonances occurs.

What is claimed is:

1. A device for controlled transferring of electromagnetic energy of a given initial frequency range to a selected target range of frequencies, the target range having lower frequencies than the initial range, said device comprising a cavity with reflecting walls, and having a quality factor determined by the cavity's size, shape and reflectivity and optionally a medium within at least part of the cavity, wherein the quality factor and the reflectivity of the cavity are chosen such that the transition probabilities between neighboring modes are always larger than the respective absorption probabilities of the photons, the size of the cavity and optionally the medium in the cavity being chosen such that the given initial frequency range of the electromagnetic radiation and the target range of the frequencies of the electromagnetic radiation are within the spectrum of eigen modes of the cavity, and means for coupling into said cavity electromagnetic radiation at greater than a critical energy density such that the controlled transferring of electromagnetic energy of photons of given frequency to photons of lower frequencies build up a Bose-Einstein condensate of photons.

2. A device according to claim 1, wherein the size and the shape of the cavity is selected such that two neighboring modes in the region between the desired initial resonance frequency and the target resonance frequency overlap sufficiently so that the transition probability for the transition of photons between neighboring modes is larger than the probability for an absorption of the photons in the cavity.

3. A device according to claim 1, wherein the boundary of the cavity is fractally designed such that two neighboring modes in the region between the desired initial resonance frequency and the target resonance frequency overlap sufficiently so that the transition probability for the transition of photons between neighboring modes is larger than the probability for an absorption of the photons in the cavity.

4. A device according to claim 3, wherein the cavity is substantially two-dimensional, having an area with a fractal peripheral boundary having an edge dimension given by 1+e, wherein 0<e<1.

5. A device according to claim 4, further comprising a cascade of cavities arranged above one another, wherein the individual cavities have different ground states.

6. A device according to claim 3, wherein the cavity is three-dimensional having a fractal peripheral boundary with a surface dimension given by 2+e, wherein 0<e<1.

7. A device according to claim 6, further comprising a cascade of cavities coupled to each other, whereby the individual cavities have different ground states.

8. A device according to claim 1, wherein the cavity is filled with a medium selected so that two neighboring modes in the region between the desired initial resonance frequency and the target resonance frequency overlap sufficiently so that the transition probability for the transition of photons between neighboring modes is larger than the probability for an absorption of the photons in the cavity.

9. A device according to claim 1, wherein the means for coupling in the electromagnetic radiation have a long wave pass filter which cuts off wave lengths which are smaller than a preset value.

10. A device according to claim 1, wherein the means for coupling in the electromagnetic waves comprises a laser or a source of microwaves or radio waves.

11. A device according to claim 1, wherein the cavity is constructed in such a way, that all transition probabilities between neighbouring resonances of the cavity are larger than the respective absorption probabilities.

12. A device according to claim 1, wherein the cavity is constructed so that the radiation is chaotically, irregularly propagating thereby provoking transition of photons between resonances of the cavity wherein the transition probability is larger than the respective absorption probability and the transitions of resonances of high frequencies to resonances of lower frequencies support the establishing of the Bose Einstein photon condensate.

13. A device according to claim 1, wherein the means for coupling in the electromagnetic waves comprises means for injecting microwaves or radio waves.

14. A method for the controlled transferring of photos of at least one selected resonance frequency of an electromag netic resonator to a selected target resonance of the resonator, whereby the photon transfer supports the redistribution of electromagnetic radiation between the resonances of the resonator with the generation of a Bose Einstein photon condensate, said method comprising steps of selecting the size, shape, reflectivity and medium of the resonator so as to produce a transition probability for transition of photons between neighboring modes in a range between the initial resonant frequencies and a target resonant frequency, which transition probability is greater than its probability for the absorption of photons and coupling into said cavity electromagnetic radiation at greater than a critical energy density such that the controlled transferring of electromagnetic energy of photons of given frequency to photons of lower frequencies build up a Bose-Einstein condensate of photons.

* * * * *